(12) United States Patent
Colasacco

(10) Patent No.: US 10,686,230 B2
(45) Date of Patent: Jun. 16, 2020

(54) BACKUP BATTERY SYSTEM

(71) Applicant: Rocco John Colasacco, Wittman, AZ (US)

(72) Inventor: Rocco John Colasacco, Wittman, AZ (US)

(*) Notice: Subject to any disclaimer, the term of this patent is extended or adjusted under 35 U.S.C. 154(b) by 235 days.

(21) Appl. No.: 15/465,191

(22) Filed: Mar. 21, 2017

(65) Prior Publication Data
US 2017/0274798 A1    Sep. 28, 2017

Related U.S. Application Data

(60) Provisional application No. 62/313,687, filed on Mar. 25, 2016.

(51) Int. Cl.
| | |
|---|---|
| *H01M 10/44* | (2006.01) |
| *H02J 7/14* | (2006.01) |
| *H01M 10/42* | (2006.01) |
| *H01M 10/48* | (2006.01) |
| *H02J 7/34* | (2006.01) |
| *H02J 7/00* | (2006.01) |

(52) U.S. Cl.
CPC ....... *H01M 10/44* (2013.01); *H01M 10/4207* (2013.01); *H01M 10/48* (2013.01); *H02J 7/1423* (2013.01); *H02J 7/342* (2020.01); *H01M 10/4257* (2013.01); *H01M 2220/20* (2013.01); *Y02T 10/7005* (2013.01)

(58) Field of Classification Search
CPC ...... H01M 10/44; H02J 7/0054; H02J 7/1423; H02J 2007/0098
See application file for complete search history.

(56) References Cited

U.S. PATENT DOCUMENTS

| | | | | |
|---|---|---|---|---|
| 3,610,371 | A * | 10/1971 | Abbott | B66B 5/027 187/290 |
| 7,915,862 | B2 * | 3/2011 | Kim | H01M 10/482 320/133 |
| 8,527,618 | B1 | 9/2013 | Wiese | |
| 9,579,990 | B2 * | 2/2017 | Butler | H02J 7/0004 |
| 10,454,315 | B2 * | 10/2019 | Lickfelt | G07C 9/00174 |
| 2002/0105443 | A1 * | 8/2002 | Flick | B60R 25/04 340/988 |
| 2003/0160510 | A1 | 8/2003 | Mizutani et al. | |
| 2006/0272868 | A1 | 12/2006 | Fuse et al. | |

(Continued)

*Primary Examiner* — Michael C Zarroli
(74) *Attorney, Agent, or Firm* — Arno T. Naeckel

(57) ABSTRACT

Methods and systems are provided for the automatic provisioning of backup starting power to a starter of a vehicle with a depleted main starting battery. The system comprises a backup battery installed in the vehicle and electrically coupled conditionally to the main starting battery, a controller, a wireless transceiver and a wireless personal computing device with a recharging application installed therein. An exemplary method includes monitoring the main starting battery and the backup battery, receiving a recharge command, electrically connecting the backup battery to the main starting battery, starting the vehicle and disconnecting the backup battery. The installed application also comprises a graphical user interface though which the deterioration of the main charging battery may be monitored and through which the controller may send an assistance request to a third party.

13 Claims, 5 Drawing Sheets

(56) References Cited

U.S. PATENT DOCUMENTS

| | | | |
|---|---|---|---|
| 2011/0082621 A1* | 4/2011 | Berkobin | B60L 58/10 |
| | | | 701/31.4 |
| 2011/0185271 A1 | 4/2011 | Aciicmez | |
| 2013/0009770 A1* | 1/2013 | Yeager | G08B 13/2402 |
| | | | 340/506 |
| 2013/0041555 A1* | 2/2013 | Kouzuma | B60R 21/013 |
| | | | 701/36 |
| 2013/0042533 A1* | 2/2013 | Netherland, III | B60J 5/0479 |
| | | | 49/358 |
| 2014/0316651 A1 | 10/2014 | Cho | |
| 2015/0084409 A1 | 3/2015 | Song | |
| 2015/0298630 A1* | 10/2015 | Iwai | B60R 16/033 |
| | | | 320/135 |
| 2015/0336468 A1* | 11/2015 | Sugiyama | B60L 11/1864 |
| | | | 701/22 |
| 2017/0166076 A1* | 6/2017 | Yoon | B60L 11/1844 |
| 2019/0133510 A1* | 5/2019 | el Kaliouby | B60W 40/08 |

* cited by examiner

300

BACKUP BATTERY SYSTEM

RELATED CASES

This utility application claims priority benefit pursuant to 35 U.S.C. § 120 from U.S. Provisional Application 62/313,687, which is herein incorporated by reference in its entirety.

TECHNICAL FIELD

The present invention generally relates to starting batteries for internal combustion engines, and more specifically to methods, systems and devices for incorporating a backup starting battery in a vehicle.

BACKGROUND

A vehicle driven by internal combustion engines is the primary type of vehicle driven worldwide today and is expected to be so well into the future. As such, the need for standard lead-acid 12 volt batteries, or their functional equivalents, to provide starting current will also be necessary well into the future. Therefore, the surprise inconveniences of having those batteries lose their charge at inopportune times and places will continue also. Battery failure is particularly common in locations with extreme cold weather such as Alaska and Canada, or extreme hot weather such as Arizona and Nevada. In such places, starting batteries may become inoperable without notice, causing great inconvenience if not creating life threatening circumstances.

Internal combustion engine vehicles typically have a single 12-volt lead-acid starting battery. Although there have been commercially unsuccessful attempts to market batteries with an integrated, manually connectable backup battery cell. There are also portable batteries on the market designed to jump dead starting batteries. However, looking at the battery arrangements in most late model vehicles, it is evident that a useful and convenient backup battery system has yet to become a commercial success. Hence, there is a need for systems and methods for providing backup starting current to a vehicle effortlessly while using a vehicle and without imposing additional maintenance burdens on a vehicle owner.

BRIEF SUMMARY

Methods and systems are provided for the automatic provisioning of backup starting power to a starter of a vehicle with a depleted main starting battery. The system comprises a backup battery installed in the vehicle and electrically coupled conditionally to the main starting battery, a relay switch coupling the main starting battery to the backup battery, a controller, a wireless transceiver, and a wireless personal computing device with a recharging application installed therein.

Exemplary methods for automatically recharging a main starting battery are presented including the monitoring of the main starting battery and a backup battery, receiving a recharge command from a remote source via a controller, electrically connecting the backup battery automatically to the main starting battery, starting the vehicle, and disconnecting the backup battery.

The installed application also comprises a graphical user interface through which the deterioration of the main charging battery may be monitored and through which the controller may be instructed to utilize the backup battery to start the vehicle or recharge the main starting battery and send an assistance request to a third party.

BRIEF DESCRIPTION OF THE DRAWINGS

The present invention will hereinafter be described in conjunction with the following drawing figures, wherein like numerals denote like elements.

DETAILED DESCRIPTION

Figure 1:
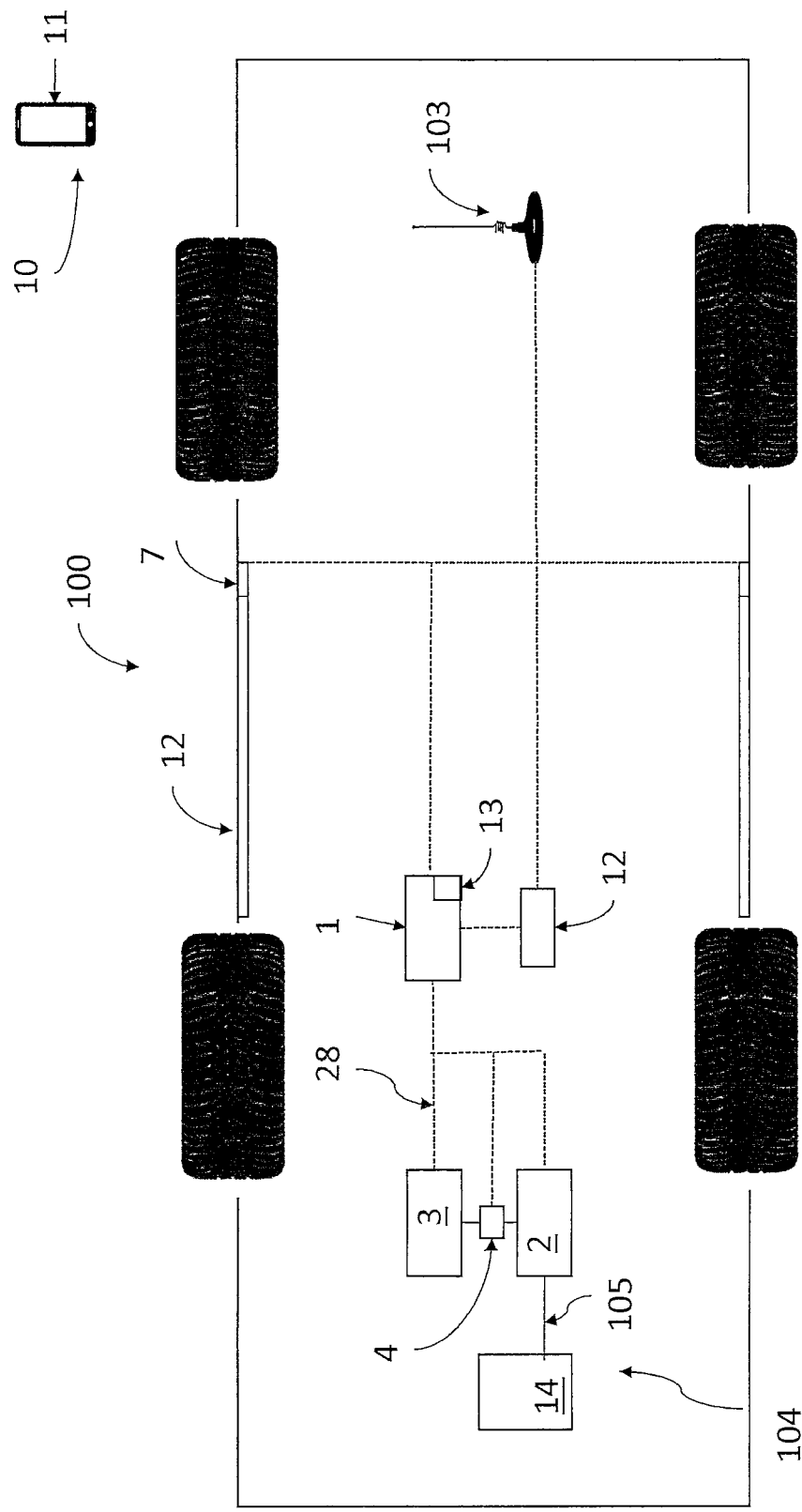
FIG. 1 is a conceptual illustration of an internal combustion engine driven vehicle including an exemplary backup battery sub-system according to embodiments included herein.

The following detailed description is merely exemplary in nature and is not intended to limit the invention, or the application, or uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described herein in terms of functional and/or logical block components (or modules) and various processing steps. However, it should be appreciated that such block components (or modules) may be realized by any number of hardware and/or software components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application. However, such implementation decisions should not be interpreted as causing a departure from the scope of the present invention. For example, an embodiment of a system or a component may employ various integrated circuit components, e.g., memory elements, digital signal processing elements, analog-to-digital converters, logic elements, look-up tables, or the like, which may carry out a variety of functions under the control of one or more microprocessors or other control devices. Those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A software module may reside in RAM memory, flash memory, ROM memory, EPROM memory, EEPROM memory, registers, hard disk, a removable disk, a CD-ROM, or any other form of digital storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Further still, the subject matter disclosed herein below may incorporate Internet of Things (IoT) concepts. "Internet of Things" is the networking of physical objects—devices, vehicles, buildings and other items embedded with electronics, software, sensors, and network connectivity—that enables these objects to collect and exchange data. The Internet of Things allows objects to be sensed and controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, smart cars, intelligent transportation and smart cities. Each thing is uniquely identifiable through its embedded computing system but is able to interoperate within the existing Internet infrastructure.

FIG. 1 is a conceptual illustration of a vehicle 100 driven by an internal combustion engine (not shown) including an exemplary backup battery sub-system 104 according to embodiments included herein. In addition to components typically found in vehicle, the battery subsystem 104 includes a main starting battery 2. The main starting battery 2 is typically a nominal 12 volt (v) lead acid battery large enough to provide between about 200 and 1000 cold cranking amperes (CCA), which is sufficient to energize and operate engine starter 14 through electrical cable 105. For large vehicles, the main starting battery 2 may be configured to provide over 1000 CCA to starter 14. Main starting battery 2 is electrically connected to the engine starter 14 by an electric cable 105 of suitable size and material capable of safely handling the rated CCA of the vehicle starter 14.

System 104 also includes a backup battery 3 electrically coupled to the main battery 2 through relay switch(s) 4. The backup battery 3 may be a duplicate of the main battery 2 or may be some other type of suitable battery known in the art or that may be invented in the future that is capable of storing sufficient energy to actuate starter 14 in the event that a charge on the main starting battery 2 is depleted beyond the ability to operate the starter 14. The backup battery 3 may be electrically coupled to the starter 14 and to the main battery 2 in series or in parallel, or a combination thereof, through relay switch(s) 4. Or, each of the backup battery 3 and the main battery 2, may be independently or alternatively coupled to the starter 14 through relay switch(s) 4. The electrical connection of backup battery 3 to the main battery or directly to the engine starter 14, is controlled by controller 1 through a Controller Area Network Bus (CANbus) 28.

A CANbus is a vehicle bus standard designed to allow microcontrollers and devices to communicate with each other in applications without a host computer. It is a message-based protocol, designed for multiplex electrical wiring within vehicles. A CANbus is a typical vehicle communications system/protocol. However, equivalent embodiments may utilize alternative communications systems that may be found to be convenient.

The one or more relay switch(s) 4 may be any kind of suitable switch or relay that is capable of switching large amounts of current such at the CCA produced by the vehicle starting system 104 from one source or another. Exemplary, non-limiting switches may be a set of MOSFETs, or a set of Insulated Gate Bipolar Transistors (IGBT) arranged in series or parallel as may be desirable, or a conventional starting solenoid. Relay switch(s) 4 is controlled by controller 1 as will be further discussed below.

Door switch(s) 7 may be any type of suitable door switch known in the art or that may be developed in the future. Door switch(s) 7 may be an active electronic switch that monitors a voltage at the driver side door 12 and sends a signal to the controller 1 when the voltage changes as door 12 is opened, or the switch(s) 7 may cut off a current when the door 12 is opened, such as a dead-man switch.

Controller 1 receives input signals from the door switch 7 and/or from a computing device 10 via antenna 103 and transceiver 12. In addition, controller 1 sends and receives digital inputs and/or messages from relay switch(es) 4, backup battery 3 and main battery 2 over CANbus 28. The controller 1 is also configured to receive input signals and messages from other devices, such as timer 13. Controller 1 may be comprised of any suitable processor or logic control device that is presently known in the art or that may be developed in the future, which includes programmable logic devices such as a field programmable gate array (FPGA). Controller 1 may be a stand-alone device located conveniently anywhere in vehicle 1, or may be incorporated into the engine control unit (ECU) of the vehicle 100.

Controller 1 may also receive an input from one or more direct current voltmeters 5/6 that monitor the voltage from each of the primary battery 2, backup battery 3 and/or alternator (not shown). Voltmeters 5/6 (see, FIG. 3) may be comprised of any commercially available voltage measuring device or equivalent software. Voltmeter 5 may monitor the voltage of the main battery 2 and is capable of communicating one or more electronic signals to the controller 1 when the voltage of the main battery is above or below a minimum start voltage level of the vehicle starter 14. Similarly, voltmeter 6 may monitor the voltage of the backup battery 3 and is capable communicating one or more electronic signals to the controller 1 when the voltage of the backup battery 3 is above or below the minimum start voltage level of the vehicle starter 14 or other predetermined level. Voltmeters 5/6 may be located in any convenient location, which may be on or near the main starter battery 2, on or near backup battery 3, in controller 1, or in relay 4.

In addition to determining and reporting the battery storage levels to controller 1, the voltmeters 5/6 may also be configured with a comparator circuit(s) 207 (See, FIG. 2) as may be known in the art to compare the current voltage levels of the main battery 2 and the back-up battery 3 to one or more references voltages (analog or digital). For example, the comparison circuit(s) 207 may be digital devices or software equivalents located in controller 1 (See, FIG. 2). Although it is contemplated that the comparator circuits 207 may be located elsewhere in vehicle 100 as may prove convenient. Battery voltages may be monitored by voltmeters 5/6 from any convenient take off point in the vehicle 100, such as the ECU (not shown), an auxiliary power socket (not shown), or an on-board diagnostics reader connection (not shown).

Reference voltages for use by the backup battery subsystem 104 representing such parameters as a Minimum Start Voltage (MSV) for the main battery 2, Minimum Jump Voltage (MJV) for the backup battery 3, and Minimum Charge Voltage (MCV) of the alternator (not shown) may be digital values stored in a digital memory 206 located in Controller 1 (See FIG. 2), or may be analog voltages determined by a conventional voltage divider circuit (not shown) driven by the voltage off of main battery 2, backup battery 3 or off of a rechargeable battery located in controller 1. The voltage divider circuit may be implemented in a number of configurations. In one example, the voltage of the backup battery 3 may be sent through a buck/boost converter or a switch mode power supply to ensure a 12-v source at the output of the voltage divider circuit. Similarly, both of the voltages may be run through individual buck/boost converters to each produce a 6 v output and configure their outputs in series to provide a 12 v reference output to a regulator. Similarly, a rechargeable battery 208 may be used to provide a voltage to the buck/boost circuit. Regardless of the technique to provide any of the reference voltages disclosed herein, the reference voltag(s) provide a dependable input voltage to the voltage divider(s) that must be stable to ensure the comparator circuit(s) 207 is always reading the same input voltage.

Figure 2:
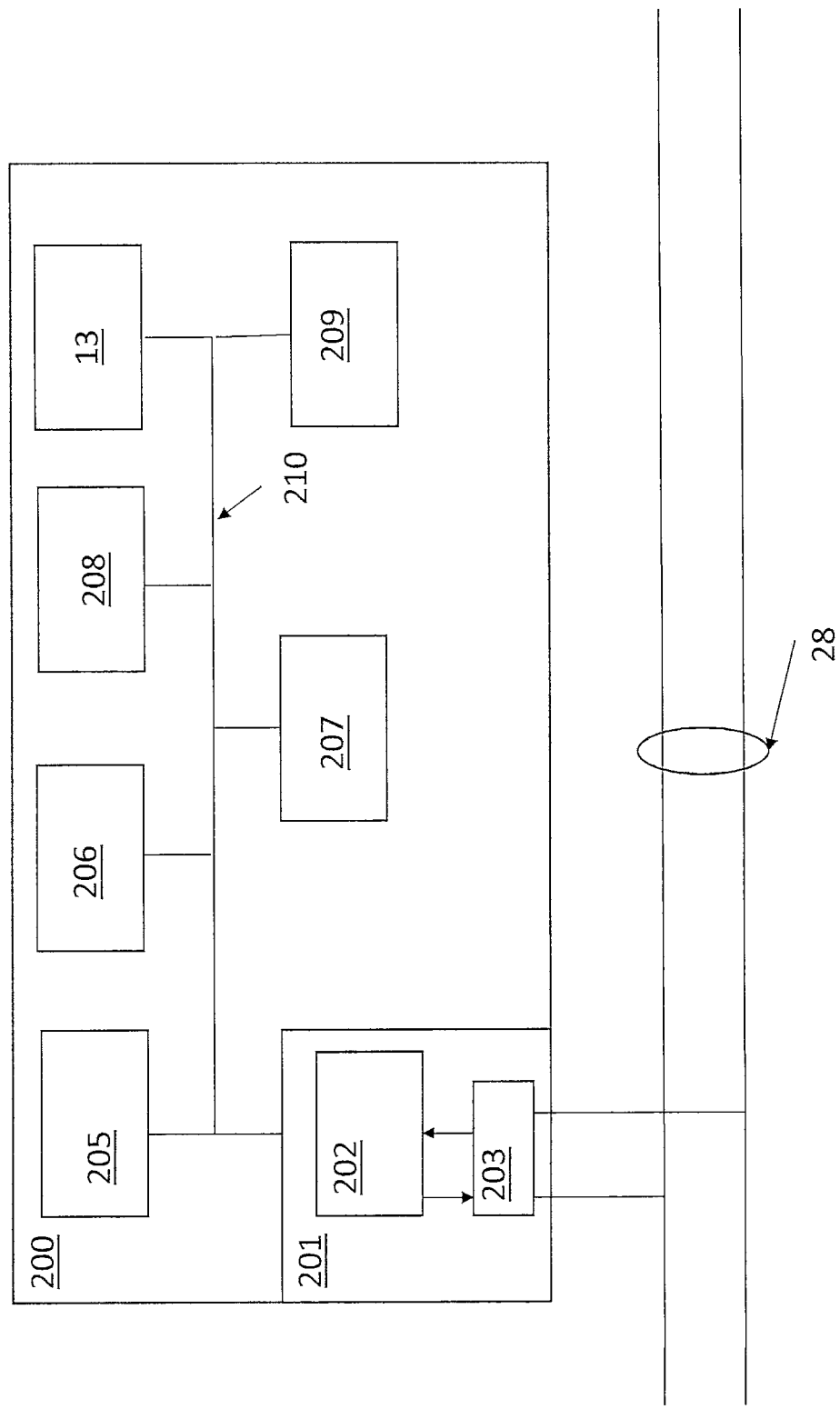
FIG. 2 is a functional block diagram of an exemplary controller.

FIG. 2 is a functional block diagram of controller 1 that communicates with the various components discussed above as well as other standard vehicle components, such as the alternator (not shown) using CANbus 28. In a vehicle, the CANbus 28 is operated by a CANbus node 201 which is usually located within a vehicle's main computer or ECU. Here, for sake of explanation, it is shown located in controller 1, which in itself may be entirely incorporated into the main ECU.

CANbus 28 operates using a message based protocol, similar to an intranet. The message traffic is controlled along the CANbus 28 by a CAN controller 202 that decides what the messages received from the various vehicle components mean and what messages it wants to transmit. Sensors (e.g., voltmeter (5/6)), actuators and control devices can be connected to the CAN controller 202. The CAN controller 202 stores received serial bits from the CANbus 28 until an entire message is available, which can then be fetched by the central processing unit (CPU) 205 (usually by the CAN controller triggering an interrupt). The CPU 205 sends transmit message(s) to the CAN controller 202, which transmits the bits serially onto the CANbus 28 when the bus is free of traffic.

The CAN Node 201 also includes a CAN transceiver 203, which converts the data stream from levels that the CANbus 28 operates on to levels that the CAN controller uses. It usually has protective circuitry to protect the CAN controller. The CAN transceiver 203 also converts the data stream generated from the levels used by the CAN controller 202 to CANbus levels.

The controller 1 also includes an internal communications bus 210 and timer 13 that can be any type of elapsed timer known in the art or that may be developed in the future. Among other functions, the timer 13 controls a time delay after the relay 4 is shut and before the ignition is permitted in order to allow an interval for the backup battery 3 to charge the main battery 2 before the starter 14 puts a large load on the main battery 2. After a predetermined time period elapses, the controller 1 allows the ignition to occur. It should be noted the timer 13 need not be incorporated in controller 1 but may be located in and convenient component or location.

Figure 3:
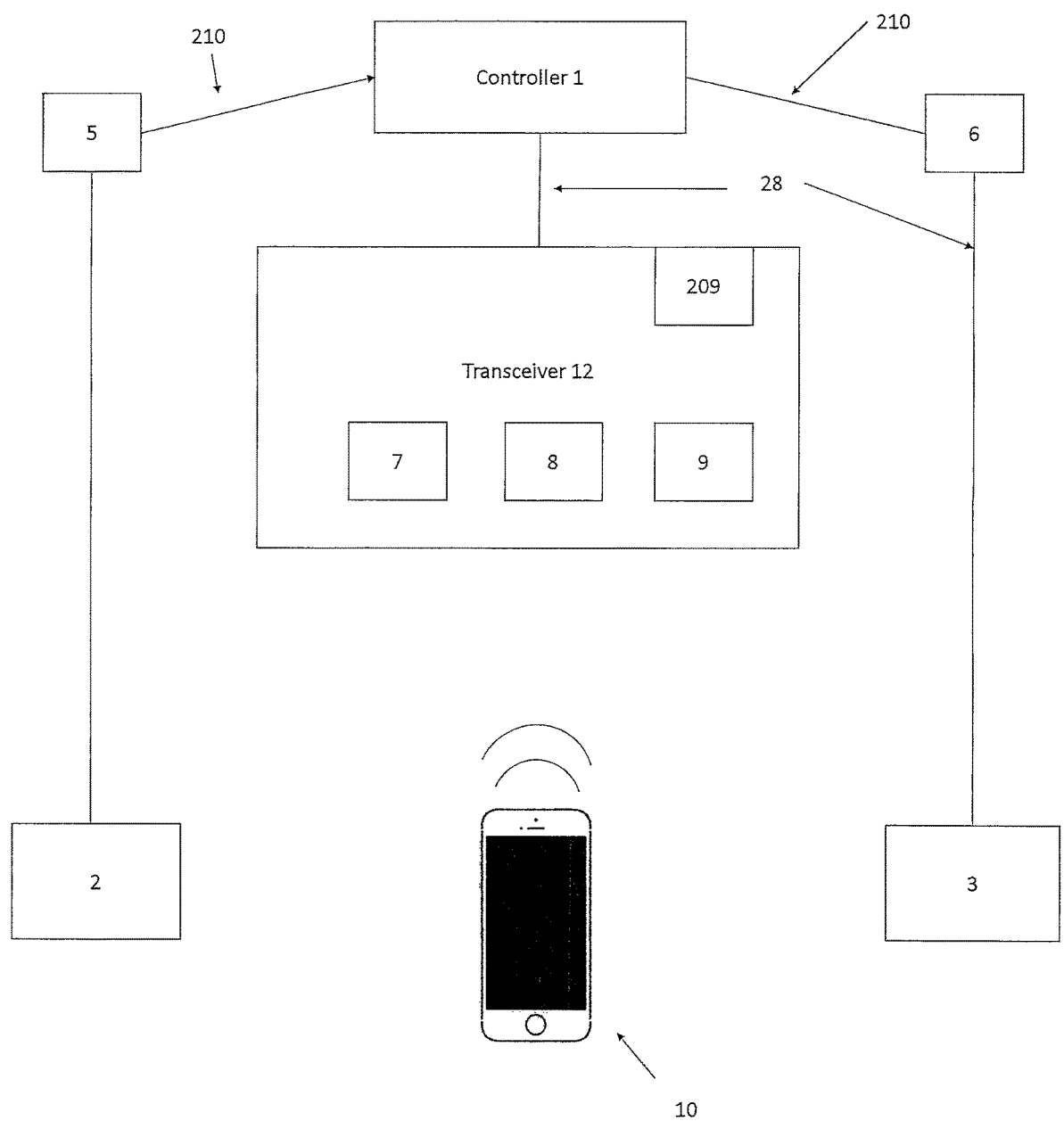
FIG. 3 is an abstract depiction of exemplary communications flow for the Backup Battery system.

FIG. 3 is an abstract depiction of the communications flow associated with the backup battery system 104. A vehicle owner owns a personal communications device 10 that may be a cellphone, a computer or any similar device with a communication ability. That personal computing device 10 has an application 11 installed that allows the user to communicate with CPU 205 using standard wireless communication protocols such as GSM, GPRS and WiFi. GSM 7 allows communications between the vehicle controller 1 and the driver or other entity via text messaging. GPRS 8 and/or WiFi 9 allow communications between the vehicle controller 1 and the driver, or other outside entity, via the internet such that an e-mail message, application updates, or application data may be communicated. The use of IoT technology may be used to create a user friendly interface.

The personal computing device 10 communicates with the wireless communications transceiver 12 that may have embedded GSM transceiver 7, embedded GPRS transceiver 8 and/or WiFi transceiver 9. As is known in the art, the wireless communications transceiver 12 converts message traffic received wirelessly from the personal communications device 10 over antenna 103 to the CANbus level communication protocol. As is also known in the art, transceiver 12 also contains a Global Positioning System (GPS) 209, which may be used to report the location of the vehicle.

The voltmeters 5/6 monitor the voltage level on the main battery 2 and the backup battery 3 and periodically report the detected voltage levels to the controller 1 via the CANbus 28. As mentioned above, the voltmeter(s) may be located in controller 1. In that case the main battery 2 and the backup battery 3 must be outfitted with a device that is capable of converting the analog output voltage of the batteries to a digital form and placing that digital information onto the CANbus 28. Such a device may be an analog-to-digital converter (not shown). It should be noted that in some equivalent embodiments only one voltmeter may be used to monitor both batteries.

Figure 4:
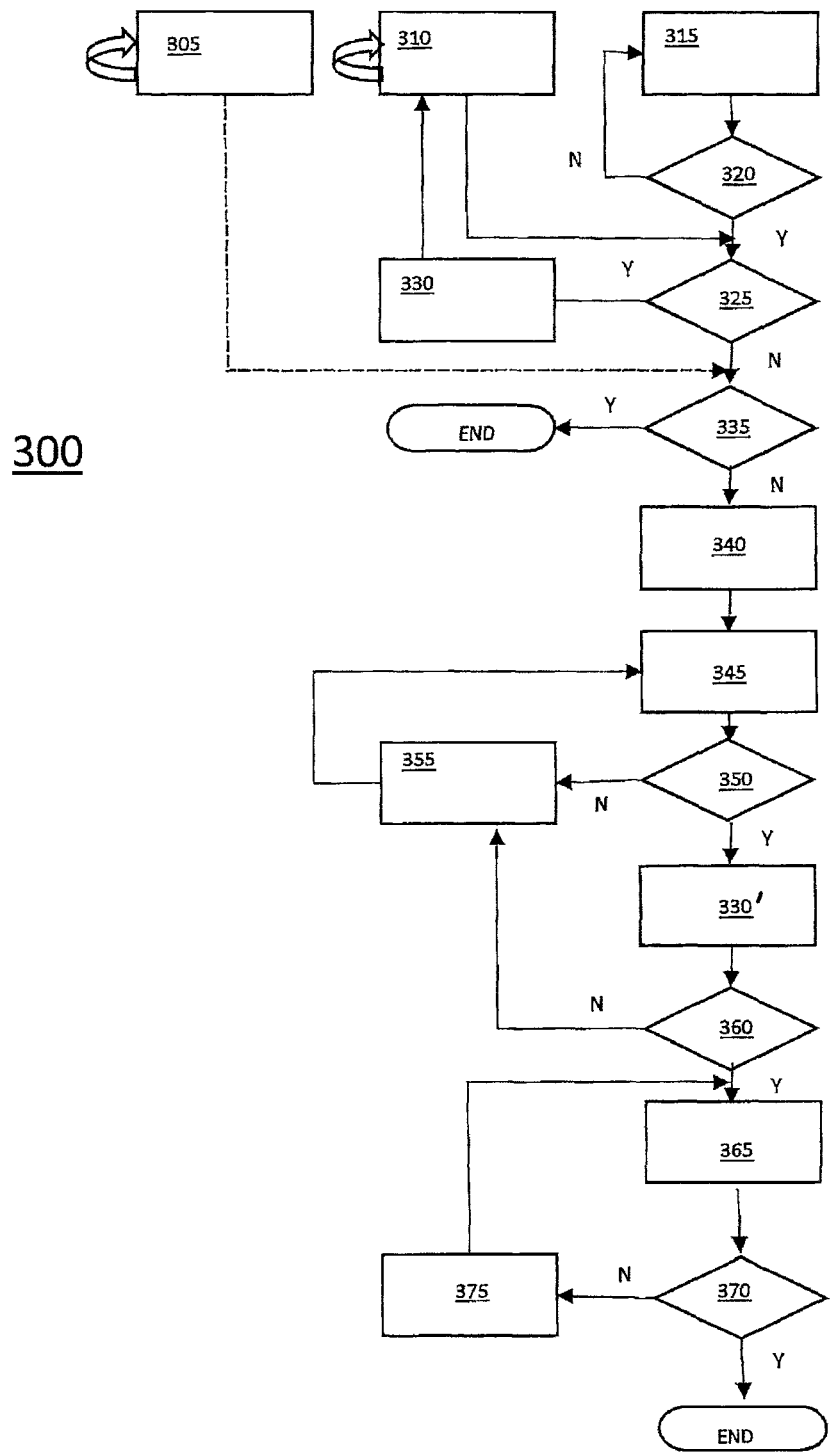
FIG. 4 is a functional flow chart of an exemplary method for automatically starting a vehicle with a back-up battery.

FIG. 4 is a functional flow chart of an exemplary method 300 for automatically starting a vehicle with a backup battery 3. At processes 305, 310 and 315, each of the backup battery 3, main starting battery 2 and the status of the drivers' side door, respectively, is checked periodically or continuously. If the controller 1 detects that drivers' side door is open at decision point 320, it then checks the main starting battery 3 to see if the voltage of the main starting battery is greater than the Minimum Starting Voltage at decision point 325. If the voltage of the main starting battery 2 is greater than the Minimum Starting Voltage, then the starter is engaged as normal at process 330 when the driver manipulates the ignition (not shown).

When the voltage of the main starting battery 2 is less than the minimum starting voltage (MSV), then the controller 1 checks the voltage level of the backup battery 3 at decision point 335. If the voltage of the backup battery is also less than the minimum starting voltage (MSV), the method ends and a message is sent to the personal communication device 10 of the driver via application 11 that both batteries have insufficient starting power, whereinafter the driver may call for assistance. The method 400 then ends.

When the voltage of the backup battery is greater than the minimum starting voltage (MSV), then the method proceeds to process 340, where the elapsed timer 13 is started and then to process 345 where relay 4 is shut allowing the backup battery 3 to supply current to the main starting battery 2. A loop is then entered at decision point 350, where the voltage of the main starting battery 2 is compared to the minimum starting voltage (MSV) and the elapsed time is checked at process 355. While the voltage at the main starting battery 2 is not more than the Minimum Starting Voltage (MSV), the loop continues through process 355, where the elapsed time is checked. When the voltage at the main starting battery 2 reaches the Minimum Starting Voltage, the controller allows the vehicle to be started at process 330.

The method 300 proceeds to decision point 360 instead of process 310 because the elapsed timer 13 is still incrementing. At decision point 360 the controller compares the voltage of the main battery 2 to a Run Voltage, which is usually the expected output voltage of the alternator (not shown). A typical alternator output voltage is approximately 13.6 volts. If the voltage at the main starting battery 2 is less than the Run Voltage, the method enters a loop and returns to processes 355, 345, and 330'. When the voltage at the main battery 2 reaches the Run Voltage, method 300 proceeds to process 365 where the relay 4 between the main battery and the backup battery is opened and the timer is stopped and reset to zero.

With the backup battery 3 coupled to the alternator, method 300 proceeds to decision point 370 where the voltage of the backup battery 3 is compared to a predetermined value (Max Value). When the voltage of the backup battery is above Max value then the method 300 ends. When the voltage of the backup battery is not above Max Value, method 300 moves to process 375, where relay 4 is again closed until Max value reached. This loop is continued until Max Value is reached.

Figure 5:
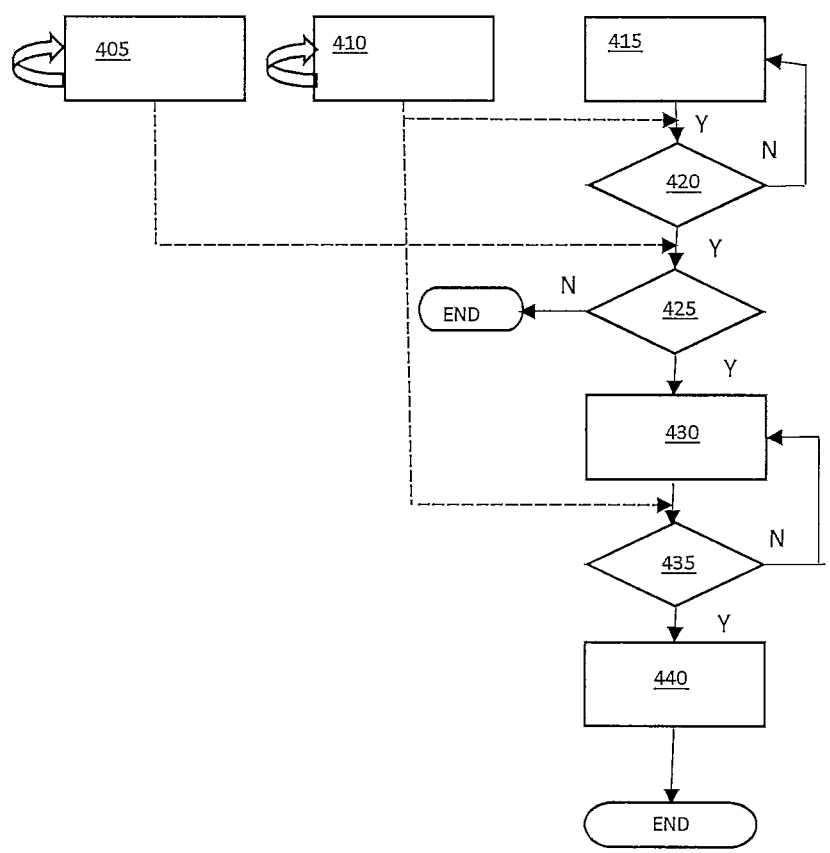
FIG. 5 is a functional flow chart of an exemplary method for remotely charging a main starting battery with a back-up battery.

FIG. 5 is a functional flow chart of an exemplary method 400 for remotely charging a main starting battery 2 with a backup battery 3. At process 415, the controller 1 monitors the transceiver 12 for a charging message received from personal computing device 10. At process 410, the controller 1 monitors the main starting battery 2 voltage and at process 405 and the controller 1 monitors backup battery 3 voltage.

At decision point 420, after a recharge message is received, the method 400 determines if the voltage of the main starting battery 2 is below a predefined level called the Discharged Level. When the voltage of the main starting battery 2 is below the Discharged Level, then the controller compares the voltage of the backup battery 3 to a predetermined level called the Backup Charging Level at process 425. If the voltage of the main starting battery 2 is not below the Discharge Level then the process returns to process 415 and a "charged" message is sent to the driver's communication device. The Discharged Level may be the same value as the Minimum Start Voltage or another desired voltage level.

When the voltage of backup battery 3 is at or above the Backup Charging Level at decision point 425, controller 1 shuts relay 4 to charge main battery 2 at process 430. The voltage of the backup battery 3 continues to be monitored at process 410 and method 400 proceeds to decision point 435. When the backup battery 3 is not at or above the Backup Charging Level, the method 400 ends because the backup battery is also depleted. A message is sent to the driver's communication device.

At decision point 435, the controller 1 compares the voltage of the main battery 2 to the predetermined Minimum Start Voltage. When the voltage of the main battery 2 is above the Minimum Start Voltage (MSV), the controller opens the relay 4 at process 440 and the methods 400 ends. When the voltage of the main battery 2 is not above the Minimum Start Voltage at process 435, the method 400 loops back to process 430, keeping the relay 4 shut.

The charging message from the driver may take the form of a Short Message Service (SMS) text message or it may be in the form of an e-mail where a predefined text string in the text of the e-mail is executable. For example, using application 11, the response for closing the relay 4 may be the pressing of the "1" button on a smartphone.

The communication layer of application 11 that is installed on the driver's communication device 10 controls the encoding and decoding of communications/data to and from the controller 1. Battery control functions of the application 11 include the receipt and presentation of alerts concerning the voltage status of each of the main starting battery 2 and the backup battery 3, such that the user is notified when voltage drops above or below a certain level. Such information also allows for a routine voltage monitoring function. The back end of application 11 also sends a shut or an open command to the relay 4 through the controller 4 over CANbus 28.

In addition to being the vehicle interface that receives data and sends charge or recharge messages, application 11 is also configured to store historical time series battery information in digital memory 206 such that a front end GUI (not shown) may present a charging history of the main starting battery 2 and backup battery 3 from which the driver may determine if either battery is failing to hold a charge and needs to be replaced. Further, the application may contain an algorithm dependent on battery type that processes the historical time series data to provide an indication to the driver that the charging pattern indicates a failing battery. Such information may be shareable over the internet with a third party service facility. In fact, a "dead battery" alert may be forwardable directly to the third party service facility that may comprise a GPS location of the vehicle 100 and/or the driver. Alternatively, the application 11 may be configured to show the location and/or phone number of the nearest or preferred service provider.

While at least one exemplary embodiment has been presented in the foregoing detailed description of the invention, it should be appreciated that a vast number of variations exist. It should also be appreciated that the exemplary embodiment or exemplary embodiments are only examples and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vehicle back-up battery system comprising:
   a vehicle starter;
   a primary battery electrically connected to the vehicle starter;
   a switch;
   a back-up battery electrically coupled to the vehicle starter via the switch;
   a controller configured to receive a parameter input from each of the primary battery and the back-up battery and further configured to control the position of the switch based on the parameter inputs, and
   a memory device containing instructions that when executed by the controller determines a status of a driver's door,
   when the driver's door is determined to be opened, determines the voltage of the main starting battery and the voltage of the back-up battery,
   when the voltage of the main starting battery is below a minimum starting voltage, determines the voltage of the back-up battery,
   when the voltage of the back-up battery is at or above the minimum starting voltage then starts a timer and shuts a relay switch, wherein the relay switch allows current to flow from the back-up battery to the main starting battery,
   determines an elapsed time on the timer and the voltage on the main starting battery,
   when the voltage of the main starting battery reaches or exceeds the minimum starting voltage and the elapsed time reaches a minimum elapsed time, enables the vehicle starter, when the voltage of the main starting battery reaches or exceeds a run voltage and the elapsed time has not reached a minimum elapsed time then opens the relay switch, and
   maintains the relay switch closed until the back-up battery voltage reaches a maximum value, then opens the relay switch.

2. The system of claim 1 further comprising a door switch in electronic communication with the controller.

3. The system of claim 1 further comprising a transceiver located in the vehicle and in communication with both the controller and a wireless communication device of a user.

4. The system of claim 3, wherein the wireless communication device executes a software application consisting of instructions that when executed by the wireless communication device receives the parameter input, displays the parameter input and controls the switch as desired by a user.

5. The system of claim 4 further comprising a communications bus linking the primary battery, the back-up battery, the switch, the controller and the transceiver.

6. The vehicle back-up battery system of claim 1 further comprising a memory device containing instructions that when executed by the controller
   monitors a transceiver for a recharge message received from a personal computing device;
   monitors a main starting battery voltage and a backup battery voltage;
   when a recharge message is received and the voltage of the main starting battery is below a Discharged Level, compares the backup battery voltage to a predetermined Back Up Charging Level; and,
   when the backup battery voltage is at or above the Backup Charging Level, then connecting the backup battery to the main starting battery.

7. The vehicle back-up battery system of claim 1 further comprising a memory device containing instructions that when executed by the controller stores historical battery data; and
   causes a wireless communication device to generate a display comprising a charging history of a battery.

8. The vehicle back-up battery system of claim 7, wherein the instructions further cause an alert to be sent to the wireless communications device indicating a dead battery.

9. The vehicle back-up battery system of claim 8, wherein the controller sends the alert indicating a dead battery to a service provider.

10. A method for providing starting current in a vehicle comprising:
    monitoring a transceiver for a recharge message received from a personal computing device;
    monitoring a main starting battery voltage and a backup battery voltage;
    receiving the recharge message;
    comparing the backup battery voltage to a predetermined Back Up Charging Level;
    determining that the backup battery voltage is at or above the Backup Charging Level;
    connecting the backup battery to the main starting battery by closing a relay a switch; and
    sending a charge message to the personal computing device via the transceiver based on the connection step.

11. The method of claim 10, wherein the charging message is one of an SMS text message and an email, either of the text message or the email containing a text string that is executable text.

12. A method for providing starting current in a vehicle comprising:
    monitoring a transceiver for a recharge message from a personal computing device;
    monitoring a main starting battery voltage and a backup battery voltage;
    receiving the recharge message, wherein the recharging message is one of an SMS text message and an email, either of the text message or the email containing a text string that is executable text;
    determining that the voltage of the main starting battery is below a Discharge Level;
    comparing the backup battery voltage to a predetermined Back Up Charging Level;
    determining that the backup battery voltage is below the Backup Charging Level;

and sending a warning message to the personal computing device based on the determining step.

13. The method of claim 12, wherein the controller connects the backup battery to the main starting battery by closing a relay switch.

* * * * *